Patented Aug. 12, 1924.

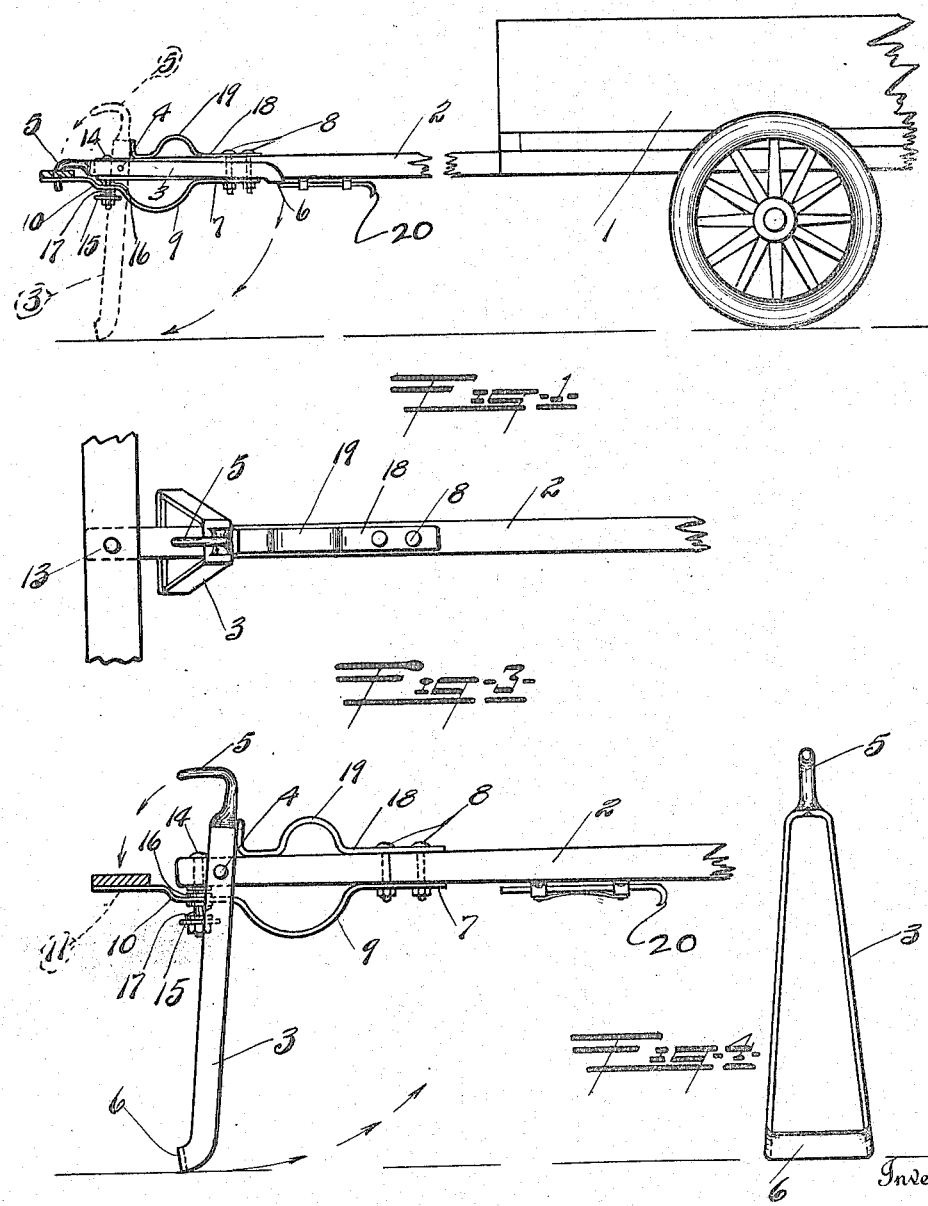

1,504,244

UNITED STATES PATENT OFFICE.

GEORGE L. HOWELL, OF MUNGER, MICHIGAN.

TRAILER HITCH.

Application filed November 25, 1922. Serial No. 603,262.

*To all whom it may concern:*

Be it known that I, GEORGE L. HOWELL, a citizen of the United States of America, and a resident of Munger, in the county of Bay and State of Michigan, have invented certain new and useful Improvements in Trailer Hitches, of which the following is a specification.

This invention relates to trailer hitches and the like.

One object of the invention is to provide a simple and practical means for coupling a trailer or the like to an automobile, or a farming implement to a tractor, and various other uses for which it may be utilized.

Another object is to provide an improved trailer hitch by means of which a trailer or other object can be very quickly and easily attached and detached from the drawing means, and which in one position forms a support for the trailer tongue, and in another position forms the locking means.

A still further object is to design a trailer hitch which will be economical to manufacture and easy to assemble and install.

With the above and other objects in view the present invention consists in the combination and arrangement of parts hereinafter more fully described, illustrated in the accompanying drawings and particularly pointed out in the appended claims, it being understood that changes may be made in the form, size, proportion and minor details of construction without departing from the spirit or sacrificing any of the advantages of the invention.

In the drawings:—

Fig. 1 is a side view illustrating the trailer hitch applied to a trailer draft member, and showing it in two different positions, the full lines showing it locked, and the dotted lines showing it used as a support for the tongue.

Fig. 2 is an enlarged side elevation illustrating the trailer hitch in place on a draft member and supporting the end thereof, the arrows indicating the arc of travel when the stay or leg is swung up when attaching to a vehicle.

Fig. 3 is a top plan view thereof, and

Fig. 4 is a front edge view of the leg or stay.

Referring now particularly to the drawing, the numeral 1 indicates a conventional trailer used to attach to the rear of an automobile for trucking freight, luggage, etc., a draft bar or tongue 2 extending from this trailer, and the trailer hitch is adapted to be secured to the end thereof.

The trailer hitch proper comprises a leg 3 formed of bar iron and pivotally connected to the tongue at the point 4. The upper end is preferably forged to form a hook or bill 5 which projects laterally therefrom as shown, while the lower end of the leg is turned as shown at 6 so that it will lie flat against the draft member when in folded or raised position.

A flat bar iron 7 is secured to the underside of the draft member, the one end being connected thereto by means of bolts 8, said strap being bent or bowed as shown at 9, thence extending forwardly and having another bend at 10, the free end projecting beyond the end of the tongue and being provided with an opening 11 therein, which when the leg 3 is swung to position against the draft member is adapted to receive the forged hook 5 formed on the upper end of the stay or leg.

A flat bar or strap 12 is rigid on the power driven vehicle (not shown) and this is also provided with an opening 13 therein so that the hook 5 may extend therethrough, consequently this member will be interposed between the hook and the free end of the bar 7 and the trailer hitch will be securely attached thereto. It will also be noted that the free end of the strap 7 is spaced from the underside of the draft member, and a bolt 14 extends through the tongue and the said strap, a large washer 15 being carried thereon. A small coiled spring member 16 is interposed between the said strap and the draft member, and a similar spring 17 is interposed between the strap and the washer, thereby providing a vertically resilient connection.

For limiting the swing of the leg or stay I provide a stop member 18 which I prefer to form of a bar of strap iron, securing it to the top of the draft member by means of the bolts 8, this is also bowed or bent as shown at 19 the free end being bent upwardly to engage and limit the swing of the leg when in position for supporting the draft member. The bending of the members 7 and 19 provides a certain resiliency for absorbing the shocks due to sudden starting and stopping and the springs 16 and 17 provide the required vertical resiliency.

For securing the hitch in locked position when traveling on the road I provide a locking member 20 which I secure to the underside of the draft member, this is a conventional latching member used on garage doors and the like, and it is not deemed necessary to describe it in detail other than to state that the latch engages the turned portion 6 of the leg and is spring actuated, and when releasing, the spring is merely retracted.

In the present illustration I have shown a flat bar which is rigidly connected to the vehicle, and which the trailer hitch engages, but it will be readily understood that any other connection may be substituted and used if desired.

From the foregoing description it will be obvious that I have perfected a very simple and economical trailer hitch for connecting trailers and other objects to vehicles.

What I claim is:

1. The combination with a draft member, of a trailer hitch comprising a strap member secured to the draft member and provided with an eye therein, a ground engaging prop pivotally connected to the draft member and formed with a bill or hook on the upper end thereof, adapted when folded to engage the eye in the strap member.

2. The combination with a draft member, of a trailer hitch comprising a strap member secured to the draft member and provided with an eye therein, a leg pivotally connected to the draft member, the upper end being formed with a laterally extending bill adapted when locked to engage the eye in the strap, and a stop for limiting the movement of the said leg.

3. The combination with a draft member, of a trailer hitch comprising a strap member secured to the underside of the draft member and an eye therein, a leg pivotally connected to the draft member the upper end of which is provided with a laterally extending hook, adapted in one position to engage the opening in the strap member, and in another position to form a support for the tongue, a stop for limiting the movement of the leg, and means for holding the leg in locked position.

4. The combination with a draft member, of a trailer hitch comprising a strap member secured thereto and provided with an eye therein, a leg embracing the draft member and pivotally connected thereto, a hook formed on the upper end of the leg and adapted to engage the eye in the strap when in one position, said leg forming a support for the draft member when in the opposite position, a stop for limiting the swing of the leg, and resilient means interposed between the strap and the draft member to permit of a limited vertical movement with relation to each other.

5. The combination with a draft member, of a trailer hitch comprising a strap member secured to the draft member, the free end projecting beyond the end thereof and being provided with an eye therein, a leg pivotally connected to the draft member and formed with a hook on the upper end thereof adapted to engage the eye in the strap when the leg is folded against the draft member, said leg forming a support for the draft member when the hitch is disconnected, a stop for limiting the swing of the tongue, and means for locking the leg in folded position.

In testimony whereof I affix my signature.

GEORGE L. HOWELL.